June 25, 1957
W. A. HARTKE
2,796,956
APPARATUS FOR AUTOMATICALLY SETTING FOOT BRAKE
OF DRIVERLESS VEHICLE ACCIDENTALLY DETACHED
FROM TOWING VEHICLE
Filed Dec. 15, 1953
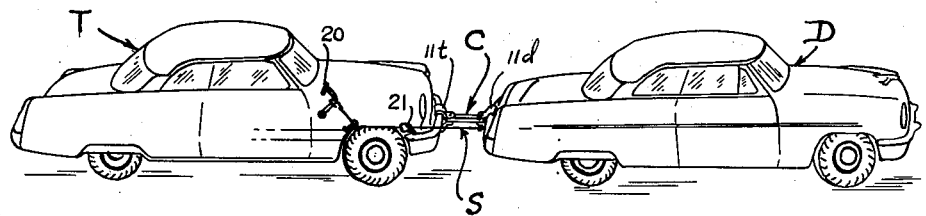
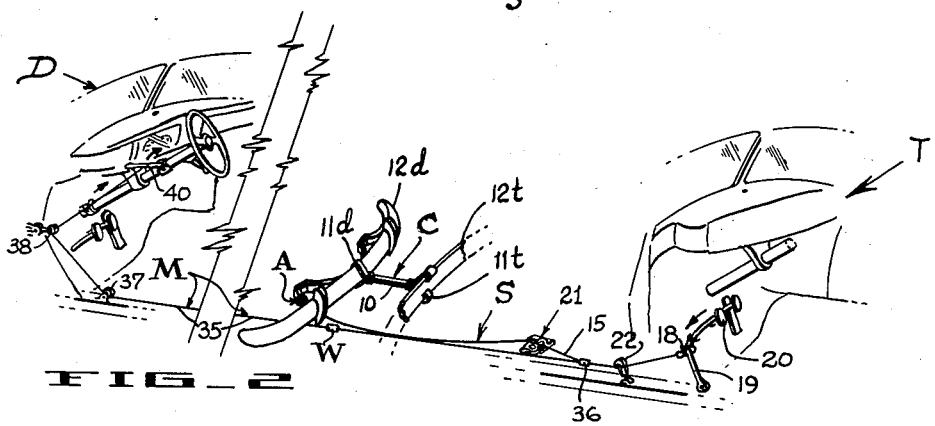
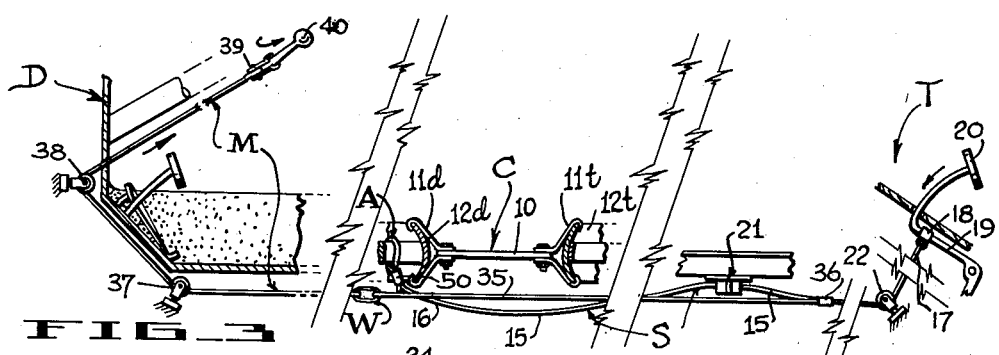
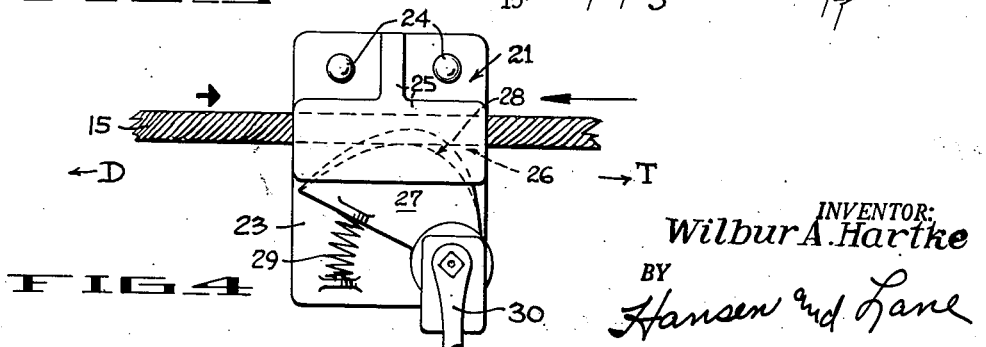
INVENTOR:
Wilbur A. Hartke
BY
Hansen and Lane
HIS ATTORNEYS.

United States Patent Office 2,796,956
Patented June 25, 1957

2,796,956

APPARATUS FOR AUTOMATICALLY SETTING FOOT BRAKE OF DRIVERLESS VEHICLE ACCIDENTALLY DETACHED FROM TOWING VEHICLE

Wilbur A. Hartke, San Jose, Calif.

Application December 15, 1953, Serial No. 398,282

3 Claims. (Cl. 188—112)

This invention relates to safety brakes for towed vehicles and more particularly to apparatus for automatically setting the brakes on the vehicle being towed in the event it accidentally becomes disconnected from the towing vehicle.

As is well known it is a common practice of car dealers to pick up several cars and to save labor by having one man operate one vehicle, hitching the other vehicle behind so as to tow it down the highway. Such practice usually involves the use of conventional couplings such as tow bars, trailer hitches and the like whereby one vehicle is connected to the other so as to be drawn driverless behind the operated vehicle. Such arrangements are accompanied by a safety chain having its respective ends secured to the towing and the towed vehicle so as to drape between them in readiness should the coupling between these two vehicles become disconnected. While such arrangements are satisfactory as a warning or signal to the operator of the towing vehicle, it is most unsafe because the so-called safety chain too can be broken leaving the towed vehicle completely unattached.

In addition to the foregoing, numerous devices and arrangements have been developed for remote controls for the brakes of the vehicle being towed from the driver's compartment of a towing vehicle. The present invention, however, goes further in providing apparatus for automatically setting the brakes of the towed vehicle upon accidental severance thereof from the vehicle by which it is towed.

The present invention contemplates an arrangement in which the safety chain while having one of its ends connected to the towing vehicle, its other end is secured to the brake pedal of the towed vehicle so as to operate the latter should the coupling device become disconnected. Moreover, with the safety chain thus arranged, a snubbing or holding device is employed to secure the safety chain in brake setting condition under such circumstances.

These and other objects and advantages of the present invention will become apparent in the following description in view of the drawings in which:

Fig. 1 is a side perspective of a towing and towed vehicle employing the present invention.

Fig. 2 is a schematic perspective showing the safety apparatus of the present invention and associated parts of the towed and towing vehicles.

Fig. 3 is a foreshortened longitudinal section through those portions of the towed and towing vehicles having the apparatus of the present invention associated therewith.

Fig. 4 is an enlarged detail of a snubbing device employed in the apparatus shown in Figs. 1 through 3.

Referring to Fig. 1, D is a draft vehicle and T is a vehicle being towed thereby through the medium of a coupling C while S is a safety device embodying the present invention.

So far as the present invention is concerned, the coupling C may be any well known form of tow bar or trailer hitch. For purposes of illustration, I have shown it as a tow bar 10 having a clamp 11d—11t at its respective ends adapted to clampingly secure it to the bumper 12d or 12t of the vehicle D or T in the conventional manner. It should be understood that the coupling C may be of the type which controls steering of the vehicle T being towed. In any event, the steering mechanism of the towed vehicle is set or fixed for straight forward running.

The safety device S embodying the present invention comprises a flexible link 15 in the form of a cable having one of its ends 16 suitably secured or anchored as at A to the chassis or some firm structure of the draft vehicle D. This anchorage A is preferably in the region of the vehicle D just adjacent the rear bumper 12d thereof to prevent fouling of the cable 15. The opposite end 17 of cable 15 is secured as at 18 to the lever portion 19 of the brake pedal structure 20 of the vehicle T being towed. The intermediate portion of the cable 15 is draped below the bumpers 12d and 12t of the two vehicles, and is trained along the chassis of the towed vehicle through a snubbing device 21 and a pulley 22 each of which is suitably secured to the chassis of the vehicle T.

The snubbing device 21 as illustrated in Fig. 4 may be similar to the line grip described and claimed in U. S. Letters Patent No. 2,080,700, dated May 18, 1937. Briefly, the snubbing device 21 consists of a bracket plate 23 secured by rivets 24 to the chassis. The bracket plate 23 is provided with an upstanding web 25 formed integrally with a flange disposed parallel to the plate 23 and spaced therefrom to form a guideway 26 for the cable 15.

A cam wedge 27 is pivotally mounted on the plate 23 and has a cam face 28 of ellipsoid configuration adapted to bear against the cable 15. The cam wedge 27 is normally urged toward the cable 15 by a spring 29. The cam wedge 27 is therefore arranged relative to the guideway 26 and cable for permitting movement of the latter in one direction (to the left in Fig. 4) but for snubbing or preventing movement of the cable in an opposite direction (to the right in Fig. 4). The snubbing device 21 is, however, provided with a lever 30 for manually turning the cam wedge 27 in a direction against the action of its spring 29 to release the binding effect of the cam face 28 relative to the cable 15.

The snubbing device 21 is arranged on the chassis of the vehicle T being towed just to the rear of the bumper 12t to permit the cable 15 to be drawn forwardly but to prevent movement of the cable in the opposite direction unless the cam wedge 27 is manually released.

With the foregoing arrangement it will be noted that should the coupling C become disconnected, the cable 15 being anchored as at A to the draft vehicle D will automatically set the brakes on the towed vehicle T. This is accomplished when the cable 15 is pulled forwardly relative to the towed vehicle T to draw the lever 19 of the brake pedal on the latter down resulting in the application of the brakes on the towed vehicle. Simultaneously therewith the snubbing device 21 will bind the cable 15 in its forwardly pulled position relative to the towed vehicle to hold the lever 19 of the brake pedal 20 thereon in brake setting position. Thus the towed vehicle will automatically slow down and eventually stop within a minimum of highway travel.

If desired, the safety device S may be employed with apparatus M for remotely controlling the brakes of the towed vehicle from the driving compartment of the draft vehicle D. This remote control apparatus M consists of an auxiliary cable 35 having its rearmost end 36 secured to the intermediate portion of the cable 15 to the rear of the snubbing device 21. The opposite end of the auxiliary cable 35 is trained through a series of pulleys 37—38 and up into the driving compartment of the draft vehicle D where it is connected as at 39 to a control lever 40. In this manner the driver of the draft vehicle can control the brakes on the towed vehicle and keep it under control.

When the invention herein is used in combination with a remote control apparatus such as the one M illustrated, a weak link W is preferably employed. This weak link is arranged between the ends of the auxiliary cable 35 somewhere near the rear bumper 12d of the draft vehicle D. The weak link W is calculated to withstand normal tensioning of the cable 35 during application of the brakes on the towed vehicle from the driver compartment of the draft vehicle. However, should any strain or tension appreciably greater than that required for the foregoing purpose be exerted on the cable 35, the weakened link W will give way, or break. It will therefore be understood that when the coupling C becomes disconnected during a normal towing operation, the weak link W will assuredly break.

The cable 35 having its rearmost end 36 secured to the cable 15 will therefore not normally function to automatically apply the brakes on the towed vehicle. This function will be accomplished by the main cable 15 which passes through the snubbing device 21 so as to bind the cable 15 in brake setting position.

The anchorage A of the fore end of the main cable 15 is preferably accomplished by a safety loop embodying a clip 50 securing two strands of the cable 15 together. This clip 50 is constructed to maintain the anchorage A during automatic application of the brakes on the towed vehicle when coupling C is broken. However, after the brakes on the towed vehicle have been set and the cable 15 bound by the snubbing device 21, the clip 50 will yield to excessive strain and release the anchorage A of the cable 15 relative to the draft vehicle.

From the foregoing it will be appreciated that the present invention will assure setting of the brakes on a towed vehicle which has become disconnected during transit from its draft vehicle. This will slow down and stop such runaway or driverless vehicle and prevent its crossing over into the lane of oncoming traffic.

While I have described the apparatus for braking towed vehicles in specific detail, it will be apparent that the same is susceptible of variation, modification and/or alteration without departing from the spirit of my invention. I, therefore, desire to avail myself of all variations, modifications and/or alterations as fairly come within the purview of the appended claims.

What I claim as new and desire to protect by Letters Patent is:

1. Apparatus for automatically setting the foot brake lever on a driverless conventional passenger vehicle upon accidental uncoupling of the latter from a draft vehicle by which it is towed comprising a flexible cable having a safety loop breakable upon application of an excessive load thereto, its fore end anchored to said draft vehicle and its opposite end operatively connected to the foot brake lever of the driverless vehicle, means on said driverless vehicle for guiding said cable for movement in a fore and aft direction relative thereto, and a snubbing device on said driverless vehicle having said cable trained therethrough for binding the latter against movement in an aft direction after said cable has been pulled forwardly therethrough for holding the foot brake lever in brake applying position to thereby apply an excessive load to said safety loop.

2. Apparatus for automatically setting the foot brake lever on a driverless conventional passenger vehicle upon accidental uncoupling of the latter from a draft vehicle by which it is towed comprising a flexible cable having its aft end secured to the foot brake lever of the towed vehicle, means on said driverless vehicle for guiding said cable for movement in a fore and aft direction relative thereto, a snubbing device on said driverless vehicle having said cable trained therethrough for binding the latter against movement in an aft direction, and a safety loop at the fore end of said cable for anchoring the latter to said draft vehicle, said safety loop being yieldable upon application of the brake by the forward pull on said foot brake lever by said cable for breaking said safety loop loose from its anchoring relation relative to said draft vehicle as the latter continues to move forwardly from said driverless vehicle.

3. Apparatus for automatically setting the foot brake lever on a driverless conventional passenger vehicle upon accidental uncoupling of said driverless vehicle from a draft vehicle by which it is towed comprising a cable having its aft end secured to said foot brake lever, means for guiding said cable for axial movement including a snubbing device secured to said towed vehicle, a safety loop at the fore end of said cable for anchoring the latter to said draft vehicle, said safety loop having the capacity to maintain said anchorage up to a predetermined tensile strain for effecting a forward pull upon said cable to operate said foot brake lever and apply the brakes on said driverless vehicle upon uncoupling of the latter from said draft vehicle and for breaking said safety loop to release said anchorage upon application thereto of a tensile strain beyond said predetermined limit thereof, said snubbing device including an eccentric one way cable engaging element to afford freedom of movement of said cable in a forward direction and a binding of said cable against movement in an aft direction relative to said towed vehicle, and a lever operatively connected to said cable engaging element for manually releasing said cable for movement in an aft direction.

References Cited in the file of this patent

UNITED STATES PATENTS

| | | |
|---|---|---|
| 1,657,623 | Heinsius | Jan. 31, 1928 |
| 1,852,778 | Holanbek | Apr. 5, 1932 |
| 1,922,719 | Townsend | Aug. 15, 1933 |
| 2,129,728 | Berg | Sept. 13, 1938 |
| 2,214,776 | Pilblad et al. | Sept. 17, 1940 |
| 2,711,228 | Shank | June 21, 1955 |